United States Patent
Chuang

(10) Patent No.: US 12,336,664 B2
(45) Date of Patent: Jun. 24, 2025

(54) CUP STRUCTURE

(71) Applicant: Lung-Fei Chuang, Taichung (TW)

(72) Inventor: Lung-Fei Chuang, Taichung (TW)

( * ) Notice: Subject to any disclaimer, the term of this patent is extended or adjusted under 35 U.S.C. 154(b) by 956 days.

(21) Appl. No.: 17/447,439

(22) Filed: Sep. 12, 2021

(65) Prior Publication Data

US 2022/0400902 A1 Dec. 22, 2022

(30) Foreign Application Priority Data

Jun. 17, 2021 (TW) .................................. 110206982

(51) Int. Cl.

| | |
|---|---|
| *A47J 43/042* | (2006.01) |
| *A47J 43/08* | (2006.01) |
| *B01F 13/00* | (2006.01) |
| *B01F 15/00* | (2006.01) |
| *B01F 33/501* | (2022.01) |
| *B01F 35/32* | (2022.01) |
| *B01F 101/14* | (2022.01) |

(52) U.S. Cl.
CPC ............ *A47J 43/042* (2013.01); *A47J 43/082* (2013.01); *B01F 33/50111* (2022.01); *B01F 35/3202* (2022.01); *B01F 2101/14* (2022.01)

(58) Field of Classification Search
CPC ...... A47J 43/046; A47J 43/085; A47J 43/042; B01F 33/5011; B01F 33/50111; B01F 2101/14
See application file for complete search history.

(56) References Cited

FOREIGN PATENT DOCUMENTS

KR         20100083071 A  *  7/2010  ............ A47J 43/085

* cited by examiner

*Primary Examiner* — Elizabeth Insler
(74) *Attorney, Agent, or Firm* — CKC & Partners Co., LLC

(57) ABSTRACT

A cup structure includes a bottom, a body and a top cover. A bottom edge of the body is detachably sleeved at the bottom. The top cover is covered on a top of the body. The bottom includes a base, a driving assembly, a transmitting assembly and a cover. A top surface of the base is sunk inward and forms an accommodating space. The driving assembly is disposed in the accommodating space. The transmitting assembly is geared into the driving assembly. The cover is disposed on the transmitting assembly, wherein the cover includes a protrusion, a water-blocking layer and a mixer. The mixer is disposed on a top of the protrusion and includes at least one mixing blade. A power is transmitted to the mixer by the transmitting assembly after the power is generated by the driving assembly, so that the at least one mixing blade is rotated.

9 Claims, 15 Drawing Sheets

CUP STRUCTURE

RELATED APPLICATIONS

This application claims priority to Taiwan Application Serial Number 110206982, filed Jun. 17, 2021, which is herein incorporated by reference.

BACKGROUND

Technical Field

The present disclosure relates to a cup structure. More particularly, the present disclosure relates to a cup structure which is able to stir and mix the fluid therein.

Description of Related Art

The requirements for eating habits and exercising habits of human beings keep enhancing along with the advancing living standard. More and more people prefer ingesting foods which are more natural or more nutritious, such as natural juice or whey protein, and further complement with exercising so as to maintain a good body shape. In general, the solids contents of solids-containing beverages or instant drinks, such as natural juice or whey protein, usually precipitate because of standing for a while after prepared since they contain materials which is insoluble or having a low solubility. Moreover, there might be no usable utensils for stirring at hand while people drinking the aforementioned beverages during various activities, which not only results in the solids contents of the beverages cannot be totally ingested by human body, but also affects the flavor of the beverages.

Therefore, developing a cup structure which is able to stir and mix the fluid therein has a practical value in practice.

SUMMARY

According to one aspect of the present disclosure, a cup structure includes a bottom, a body and a top cover. The bottom includes a base, a driving assembly, a transmitting assembly and a cover. A top surface of the base is sunk inward and forms an accommodating space. The driving assembly is disposed in the accommodating space. The transmitting assembly is disposed in the accommodating space and is geared into the driving assembly. The cover is disposed on the transmitting assembly and is screwed on a top of the accommodating space, wherein the cover includes a protrusion, a water-blocking layer and a mixer. The protrusion is protruded along a direction away from the cover. The water-blocking layer is disposed around a side surface of the protrusion. The mixer is disposed on a top of the protrusion and includes at least one mixing blade, wherein a length of a projection of the at least one mixing blade vertically projected on the protrusion is shorter than a radius of an inscribed circle of a top surface of the protrusion. A bottom edge of the body is detachably sleeved at an outer edge of the water-blocking layer. The top cover is covered on a top of the body. A power is transmitted to the mixer by the transmitting assembly after the power is generated by the driving assembly, so that the at least one mixing blade is rotated.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
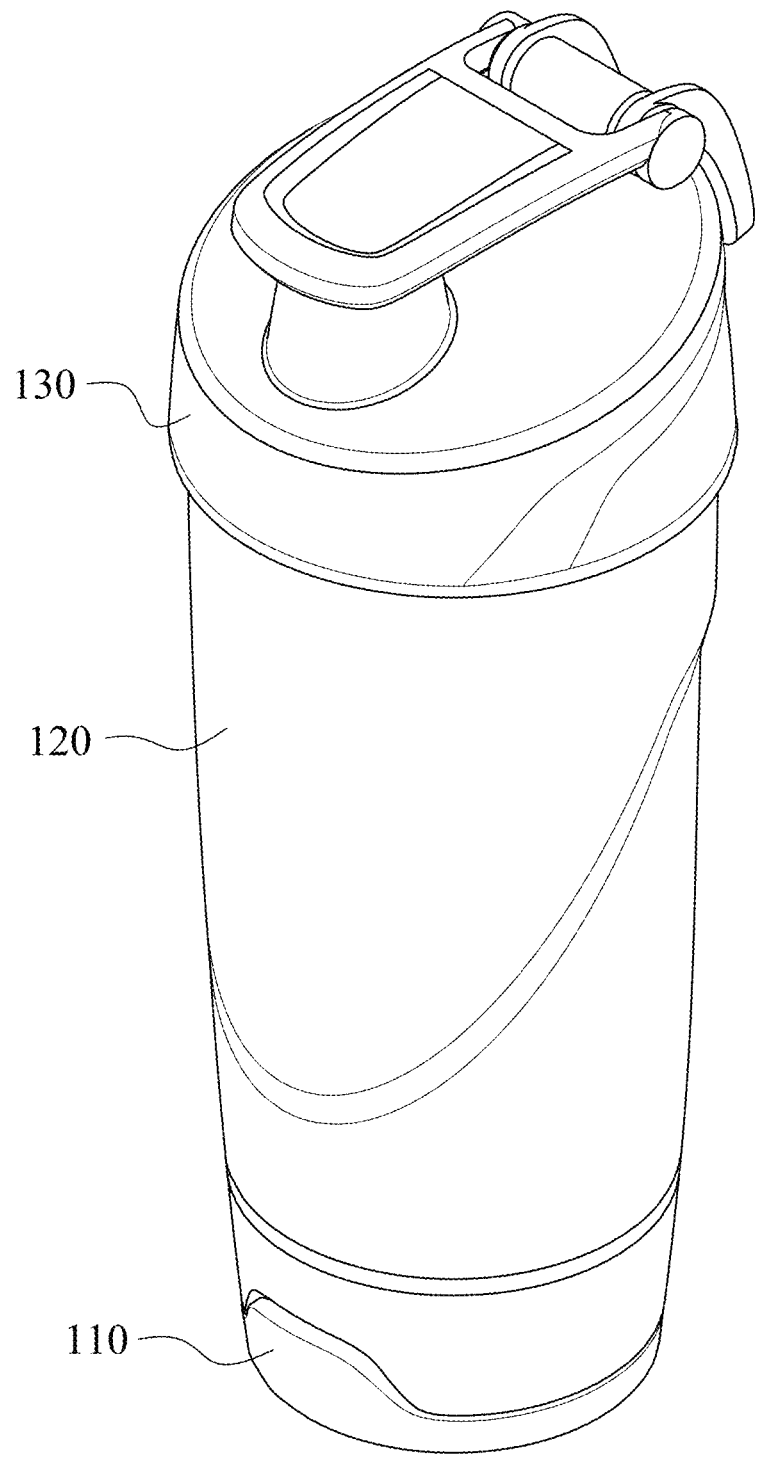
FIG. 1A is a schematic view of a cup structure according to one embodiment of the present disclosure.
Figure 1B:
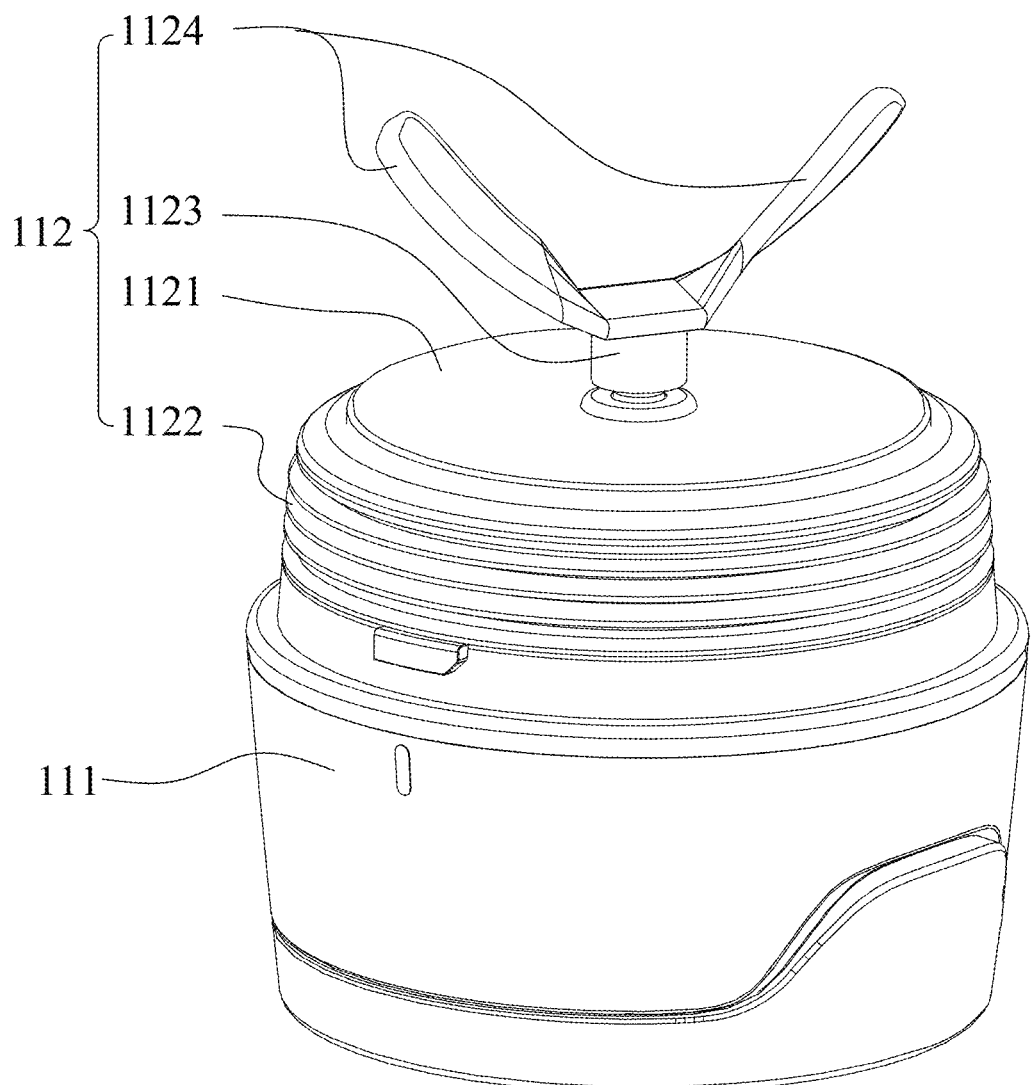
FIG. 1B is a three dimensional structure schematic view of a bottom of the cup structure according to one embodiment of the present disclosure.
Figure 1C:
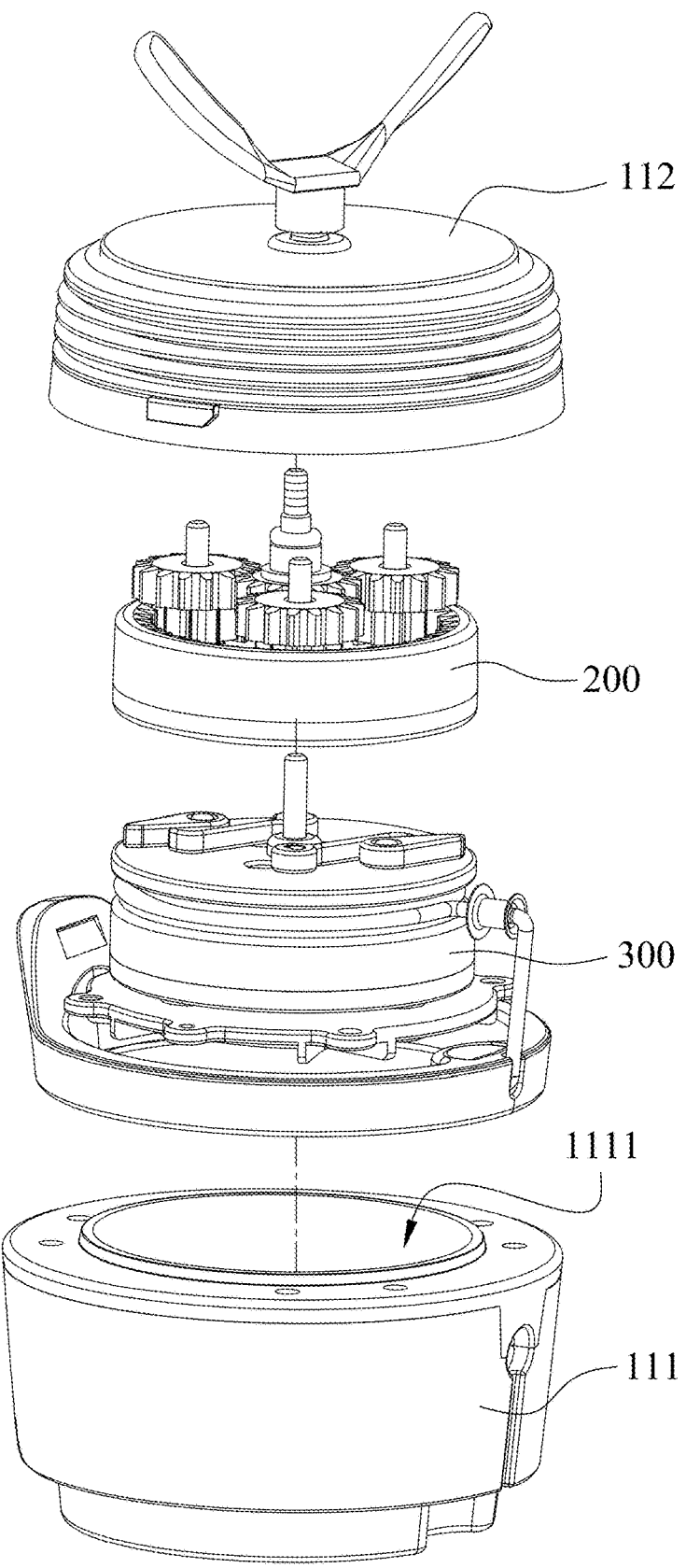
FIG. 1C is an explosive view of the bottom of the cup structure of FIG. 1B.
Figure 1D:
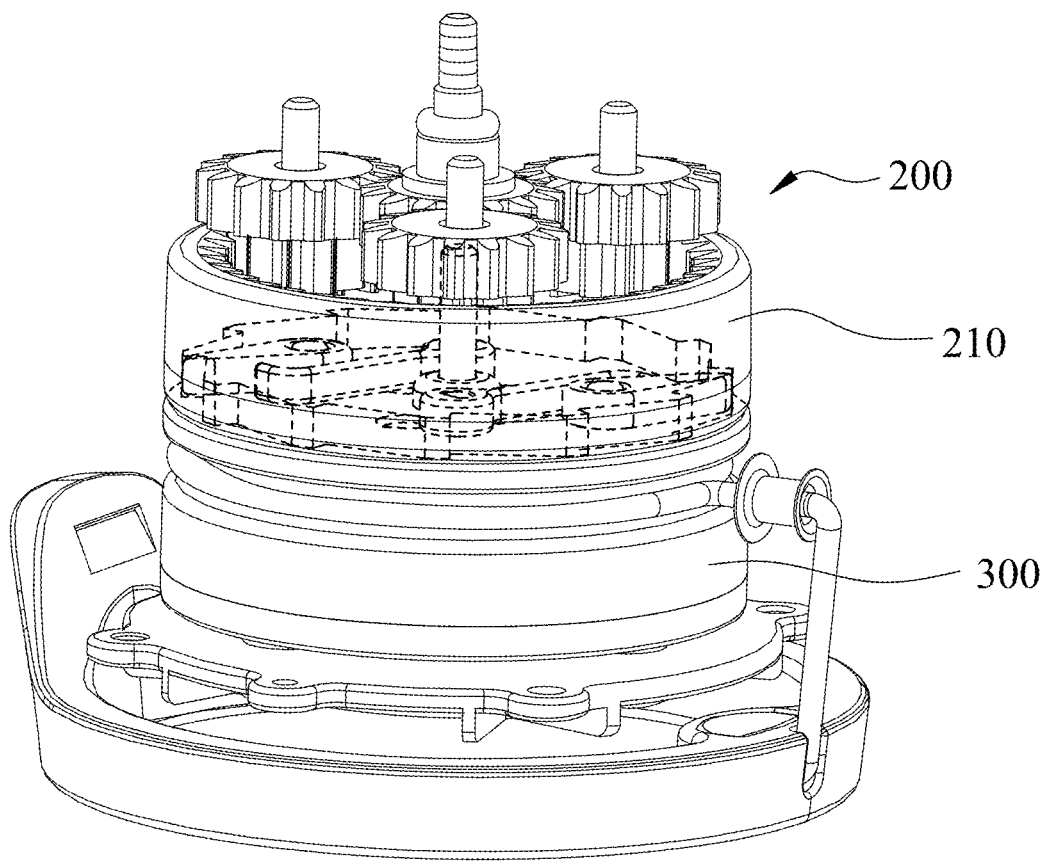
FIG. 1D is an assembly schematic view of a transmitting assembly and a driving assembly in the bottom of the cup structure of FIG. 1B.

Please refer to FIG. 1A, FIG. 1B, and FIG. 1C and FIG. 1D. FIG. 1A is a schematic view of a cup structure 100 according to one embodiment of the present disclosure. FIG. 1B is a three dimensional structure schematic view of a bottom 110 of the cup structure 100 according to one embodiment of the present disclosure. FIG. 1C is an explosive view of the bottom 110 of the cup structure 100 of FIG. 1B. FIG. 1D is an assembly schematic view of a transmitting assembly 200 and a driving assembly 300 in the bottom of the cup structure of FIG. 1B. As shown in FIG. 1A, FIG. 1B [and] FIG. 1C and FIG. 1D, the cup structure 100 includes the bottom 110, a body 120 and a top cover 130. The bottom 110 includes a base 111, a driving assembly 300, a transmitting assembly 200 and a cover 112. A top surface of the base 111 is sunk inward and forms an accommodating space 1111. The driving assembly 300 and the transmitting assembly 200 are disposed in the accommodating space 1111, and the transmitting assembly 200 is geared into the driving assembly 300. The cover 112 is disposed on the transmitting assembly 200 and is screwed on a top of the accommodating space 1111, wherein the cover 112 includes a protrusion 1121, a water-blocking layer 1122 and a mixer 1123. The protrusion 1121 is protruded along a direction away from the cover 112. The water-blocking layer 1122 is disposed around a side surface of the protrusion 1121. The mixer 1123 is disposed on a top of the protrusion 1121 and has at least one mixing blade 1124, wherein a length of a projection of the at least one mixing blade 1124 vertically projected on the protrusion 1121 is shorter than a radius of an inscribed circle of a top surface of the protrusion 1121 so as to prevent the length of the at least one mixing blade 1124 from being so long that the at least one mixing blade 1124 cannot be disposed in the cup structure 100. A bottom edge of the body 120 is detachably sleeved at an outer edge of the water-blocking layer 1122. The top cover 130 is covered on a top of the body 120. When a power is transmitted to the mixer 1123 by the transmitting assembly 200 after the power is generated by the driving assembly 300, the at least one mixing blade 1124 is rotated so as to reach the goal of mixing the fluid in the cup structure 100 of the present disclosure. In the embodiment of the present disclosure, a number of the mixing blade 1124 is two, but the present disclosure is not limited thereto.

In detail, although an outward of the body 120 of the cup structure 100 and an outward the top cover 130 of the cup structure 100 are shown in FIG. 1A of the present disclosure, the present disclosure is not limited thereto. As long as the fluid contained in the cup structure 100 does not leak to the outside of the cup structure 100 during mixing or not mixing after assembling the body 120 and the top cover 130 to the bottom 110.

Figure 2:
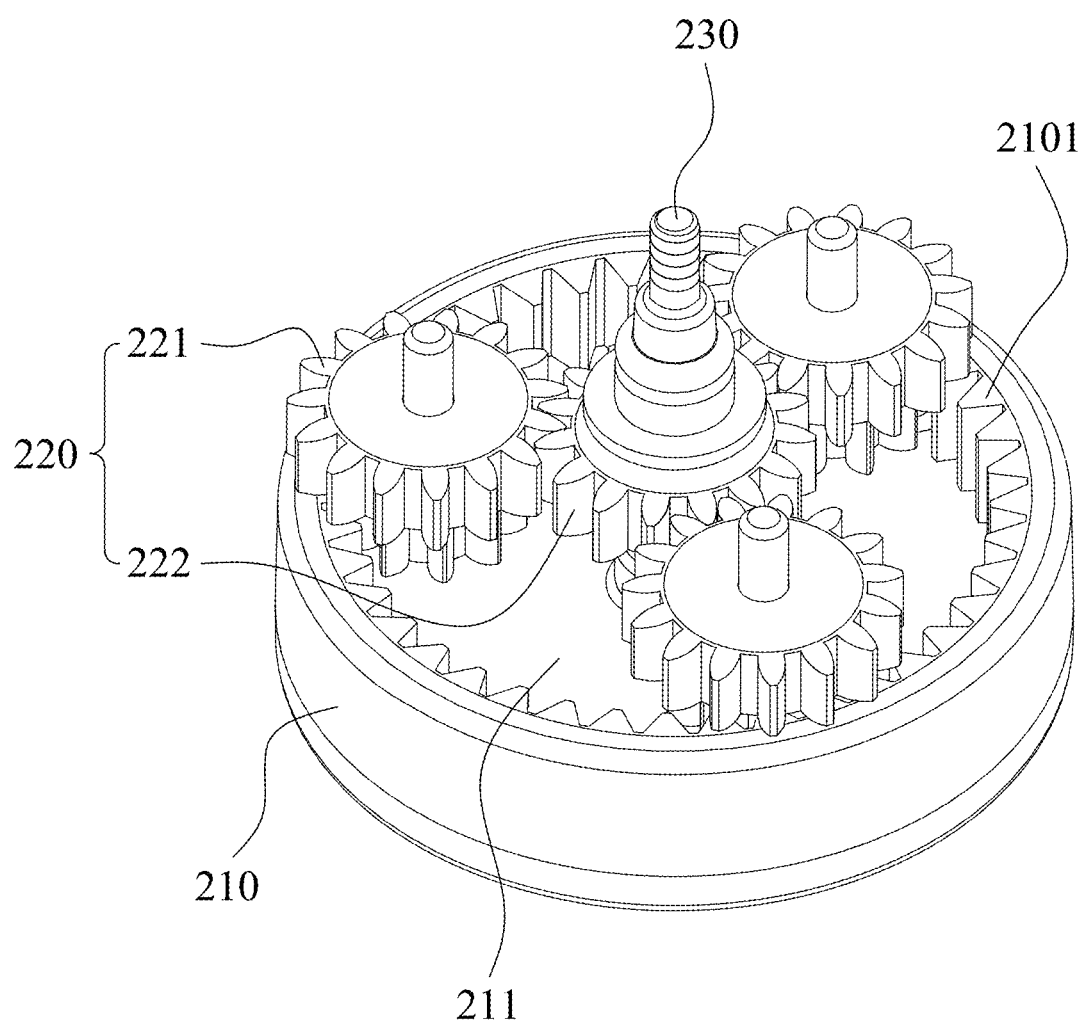
FIG. 2 is a three dimensional structure schematic view of a transmitting assembly of the cup structure according to one embodiment of the present disclosure.

Please further refer to FIG. 1D and FIG. 2. FIG. 2 is a three dimensional structure schematic view of a transmitting assembly 200 of the cup structure 100 according to one embodiment of the present disclosure. The transmitting assembly 200 can further include a ring internal gear 210, a gear assembly 220 and a transmitting axle 230. The ring internal gear 210 includes a plurality of teeth 2101 and a partition 211. The partition 211 separates the ring internal gear 210 into an upper side and a downside, and the downside of the ring internal gear 210 is internal geared into the driving assembly 300. The gear assembly 220 includes an axial transmitting gear 222 and at least one gear 221, wherein the upper side of the ring internal gear 210 is internal geared into the at least one gear 221. The transmitting axle 230 is disposed on a center of a top of the axial transmitting gear 222, wherein the transmitting axle 230 is disposed through the cover 112 and is connected to the mixer 1123 so as to transmit the power to the mixer 1123 and rotate the at least one mixing blade 1124. In detail, a number of the gear 221 of the gear assembly 220 in FIG. 2 is three, but the present disclosure is not limited thereto.

In detail, the rotating laps output can be enhanced by a gear ratio of the ring internal gear 210 to the gear assembly 220. The gear ratio of the ring internal gear 210 of the transmitting assembly 200 to the gear assembly 220 of the transmitting assembly 200 is 4:1, that is the ring internal gear 210 rotates for one turn can make the gear assembly 220 rotates for four turn, and drives the mixer 1123 and the at least one mixing blade 1124 thereon rotates for four turn. Therefore, four times the rotating laps output can be offered, but the present disclosure is not limited thereto.

Figure 3A:
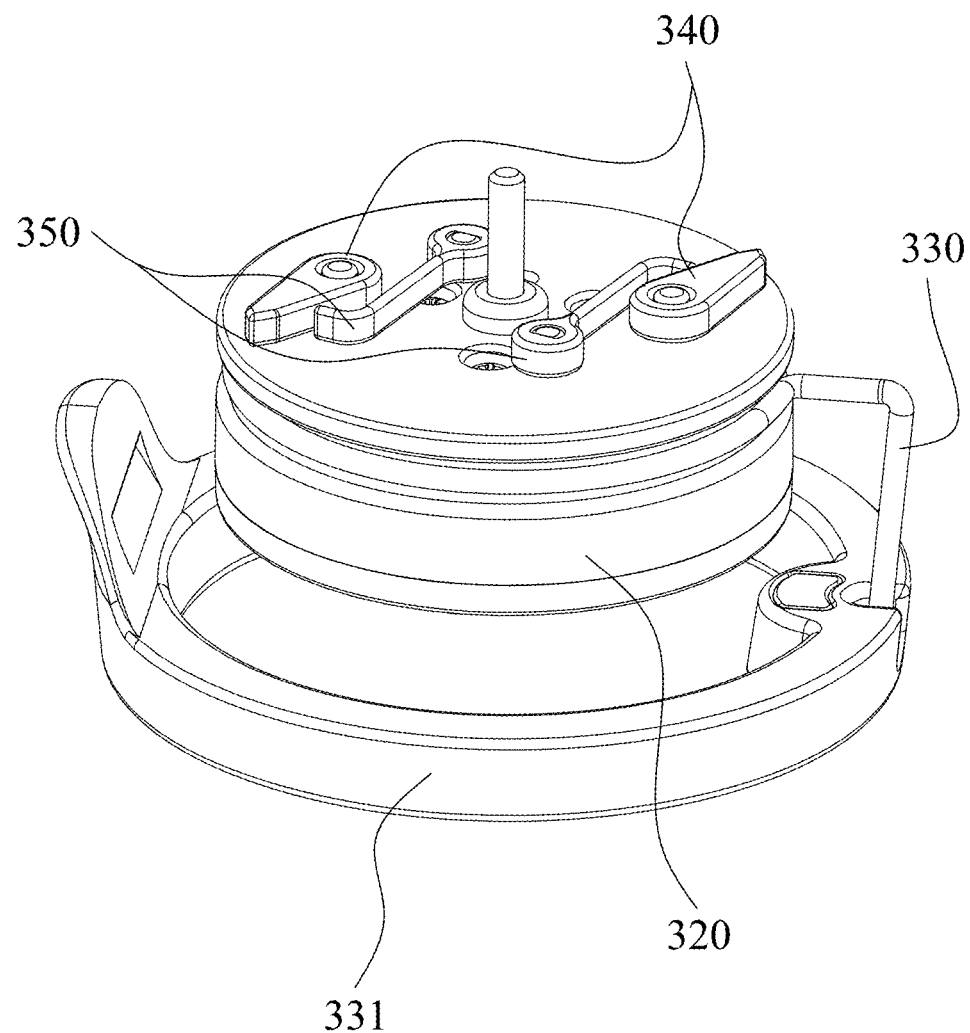
FIG. 3A is a three dimensional structure schematic view of a driving assembly of the cup structure according to 1st example of one embodiment of the present disclosure.
Figure 3B:
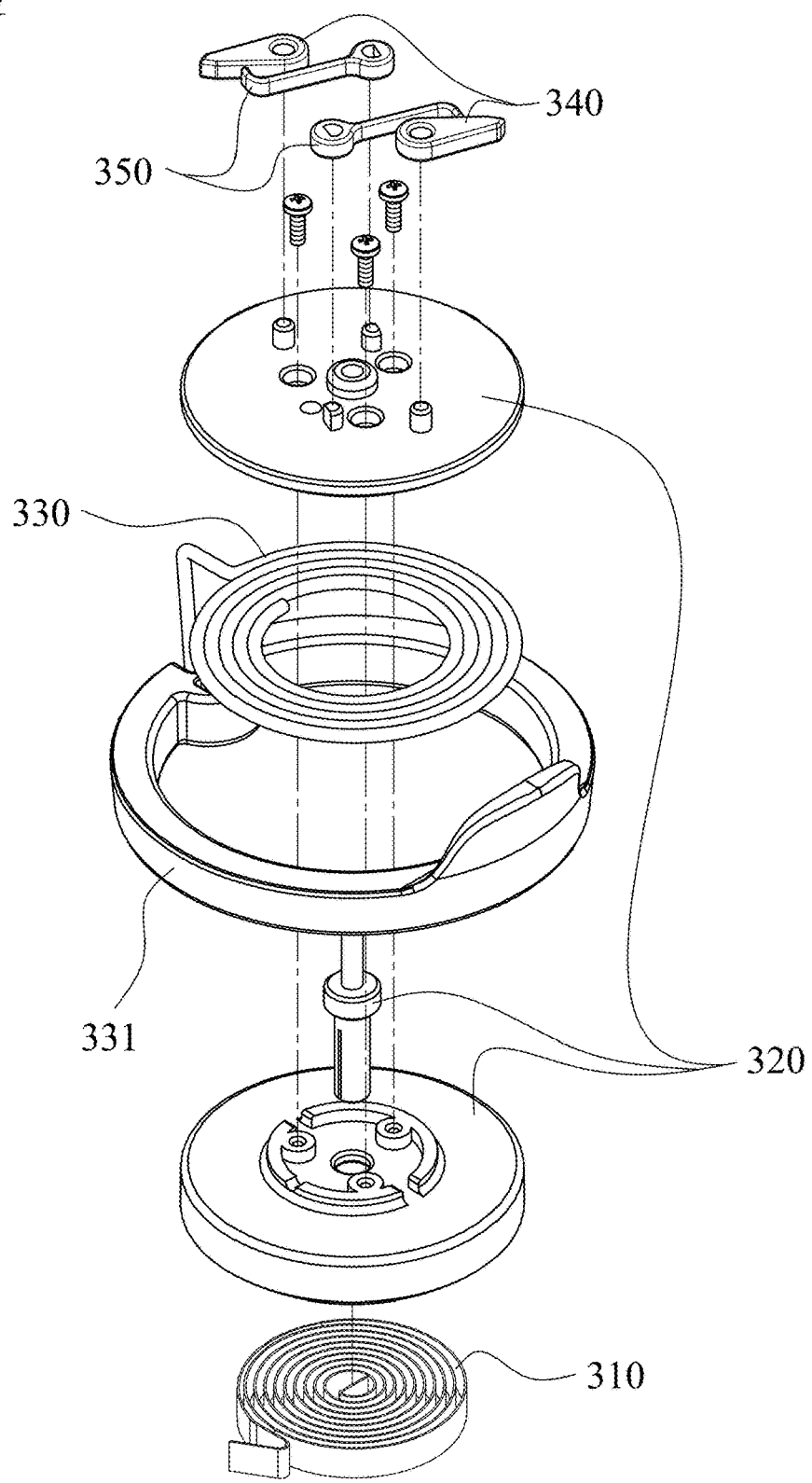
FIG. 3B is an explosive view of the driving assembly of FIG. 3A.

Please further refer to FIG. 3A and FIG. 3B. FIG. 3A is a three dimensional structure schematic view of the driving assembly 300 of the cup structure 100 according to 1st example of one embodiment of the present disclosure. FIG. 3B is an explosive view of the driving assembly 300 of FIG. 3A. The driving assembly 300 can further include a volute spring 310, a reel 320, a pulling cord 330 and at least one first ratchet tooth 340. The volute spring 310 is disposed in the accommodating space 1111. A side surface of the reel 320 is sunk inward to a center of the reel 320 and forms a groove (the numeral is omitted), and one end of the volute spring 310 is connected to a bottom surface of the reel 320. One end of the pulling cord 330 is connected to the groove, the other end of the pulling cord 330 is disposed through the base 111, and the pulling cord 330 is connected to a pulling ring 331 on the outer edge of the base 111. At least one first ratchet tooth 340 is screwed on a top of the reel 320, wherein the downside of the ring internal gear 210 is internal geared into the at least one first ratchet tooth 340.

In this example, the reel 320 can be rotated and the volute spring 310 can be stretched by pulling the pulling cord 330 away from the cup structure 100 through the pulling ring 331, and the power is transmitted to the transmitting assembly 200 by the at least one first ratchet tooth 340. On the other hand, the volute spring 310 rebounds in a reverse direction to make the reel 320 rotate in a reverse direction after the pulling ring 331 is loosened, so as to transmit the power is to the transmitting assembly 200 and make the pulling cord 330 return to an original position.

In detail, the driving assembly 300 can further include at least one brake 350 which is screwed on the top of the reel 320 and being adjacent to the at least one first ratchet tooth 340, and a number of the at least one brake 350 is corresponding to a number of the at least one first ratchet tooth 340. In this example, the number of the first ratchet teeth 340 and the number of the brake 350 are both two, but the present disclosure is not limited thereto.

Further, the pulling ring 331 of the driving assembly 300 can be stored and sleeved under the bottom 110 when a user of the cup structure 100 does not need to stir, so as to reach the goal of integrating the cup structure 100 and reduce a space occupied by the cup structure 100, but the present disclosure is not limited thereto.

Although in FIG. 1C, the driving assembly 300 is assembled with the base 111, the transmitting assembly 200 and the cover 112 to form the bottom 110, the structure of the driving assembly and the driving method of the driving assembly in other example can be different from the driving assembly 300 of this example. The related details will be further described in the subsequent paragraphs, which will not be described herein.

Figure 4A:
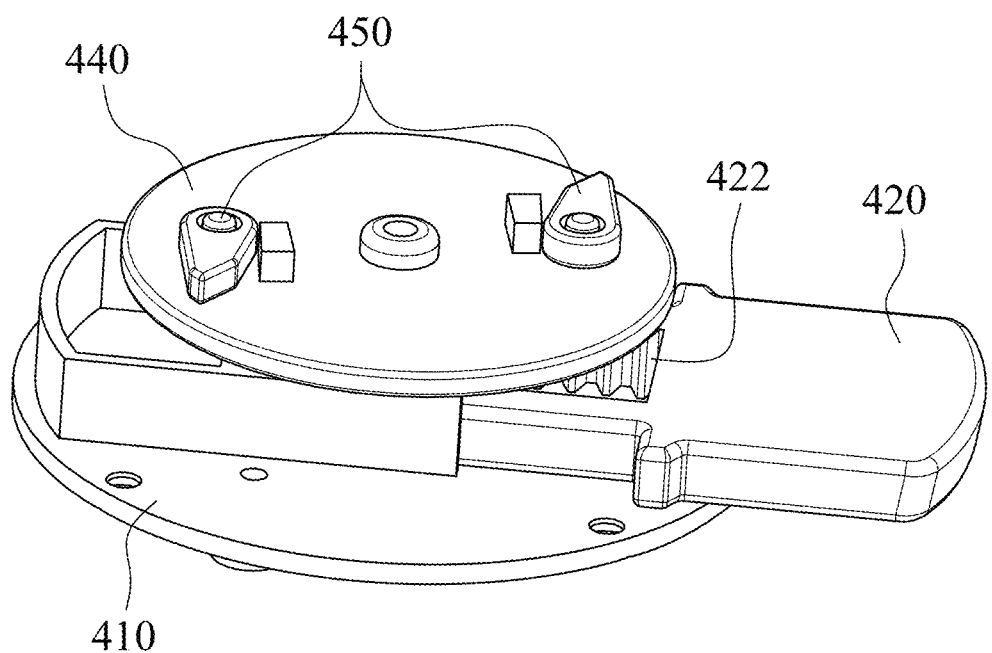
FIG. 4A is a three dimensional structure schematic view of a driving assembly of the cup structure according to 2nd example of one embodiment of the present disclosure.
Figure 4B:
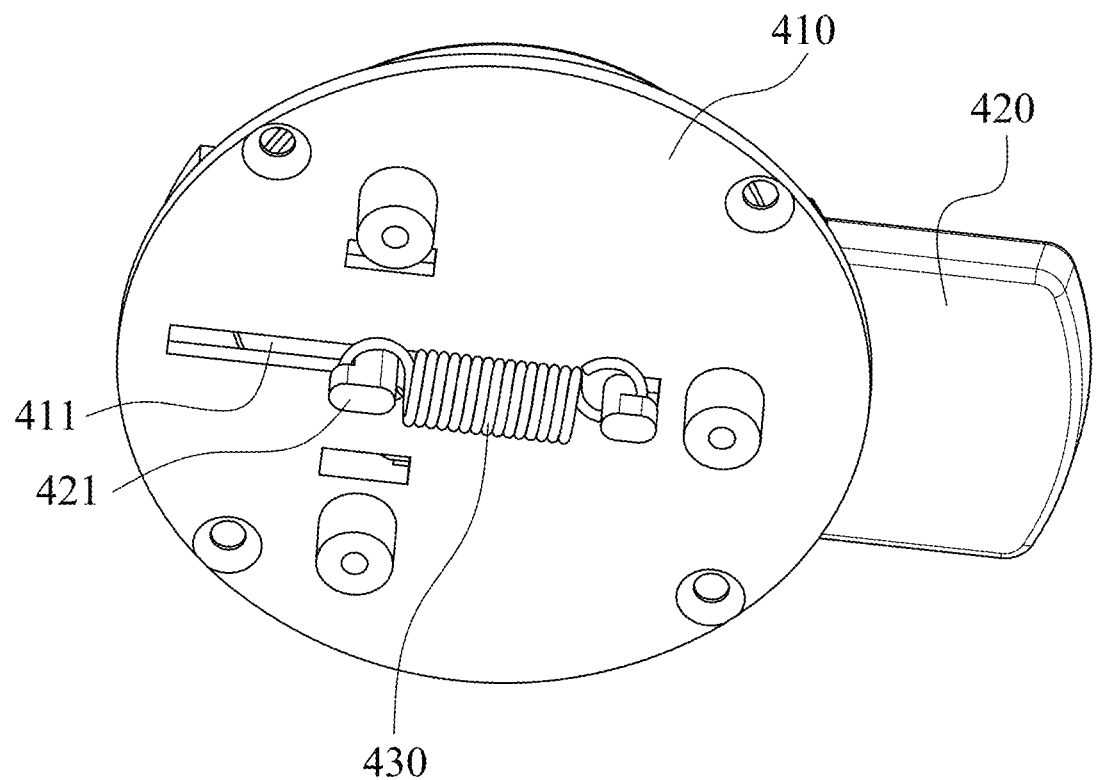
FIG. 4B is a three dimensional structure schematic view in another perspective of the driving assembly of the cup structure according to 2nd example of one embodiment of the present disclosure.
Figure 4C:
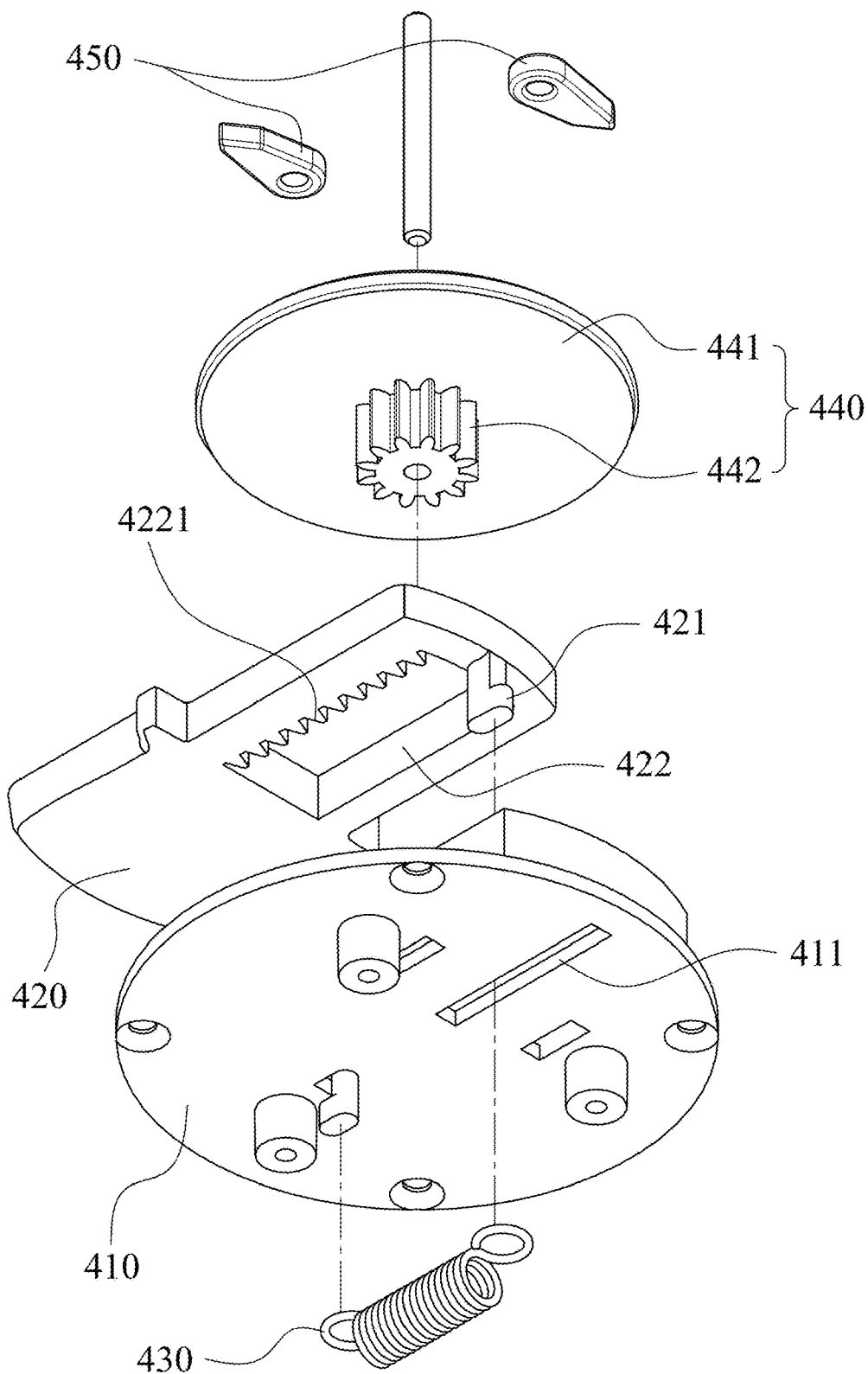
FIG. 4C is an explosive view of the driving assembly of FIG. 4A and FIG. 4B.

Please refer to FIG. 4A, FIG. 4B and FIG. 4C. FIG. 4A is a three dimensional structure schematic view of a driving assembly 400 of the cup structure according to 2nd example of one embodiment of the present disclosure. FIG. 4B is a three dimensional structure schematic view in another perspective of the driving assembly 400 of the cup structure according to 2nd example of one embodiment of the present disclosure. FIG. 4C is an explosive view of the driving assembly 400 of FIG. 4A and FIG. 4B. The driving assembly 400 can further include a first bottom plate 410, a button 420, an extension spring 430, a first rotating assembly 440 and at least one second ratchet tooth 450. The first bottom plate 410 is screwed on the top surface of the base (not shown) and includes a string-like through hole 411. The button 420 is disposed on a surface of the first bottom plate 410 facing the transmitting assembly (not shown), wherein one end of the button 420 is disposed through and protrudes from the base, a downside of the other end of the button 420 extends toward the surface of the first bottom plate 410 facing the base, and the downside of the other end of the button 420 is disposed through the string-like through hole 411 and forms a hook 421, wherein a center of a part of the button 420 inside the base has a bar-like through hole 422 at a direction vertical to the surface of the first bottom plate 410 facing the transmitting assembly, and a side of the bar-like through hole 422 has a plurality of ratchet teeth structures 4221. One end of the extension spring 430 is disposed at the hook 421, and the other end of the extension spring 430 is disposed on the surface of the first bottom plate 410 facing the base and toward a direction in which the button 420 protrudes from the base. The first rotating assembly 440 includes a first plate 441 and a first gear 442, wherein the first gear 442 is disposed protrudingly on a surface of the first plate 441 facing the base and is disposed at a center of the surface of the first bottom plate 410 facing the transmitting assembly through the bar-like through hole 422, and the ratchet teeth structures 4221 of the bar-like through hole 422 are internal geared into the first gear 442. The at least one second ratchet tooth 450 is screwed on a surface of the first rotating assembly 440 facing the transmitting assembly, wherein the downside of the ring internal gear (not shown) is internal geared into the at least one second ratchet tooth 450. In this example, the number of the second ratchet teeth 450 is two, but the present disclosure is not limited thereto.

In this example, a relative movement between the ratchet teeth structures 4221 of the button 420 and the first gear 442 of the first rotating assembly 440 can be performed by pressing the button 420 so as to rotate the first gear 442 and drive the first rotating assembly 440 to rotate and further transmit the power to the transmitting assembly through the at least one second ratchet tooth 450, and the button 420 can be released so as to rebound the extension spring 430 and make the button 420 return to an original position. Moreover, a relative movement in a reverse direction between the ratchet teeth structures 4221 of the button 420 and the first gear 442 of the first rotating assembly 440 can be performed during a position returning process of the button 420 so as to rotate the first gear 442 and drive the first rotating assembly 440 to rotate and further transmit the power to the transmitting assembly through the at least one second ratchet tooth 450.

Figure 5A:
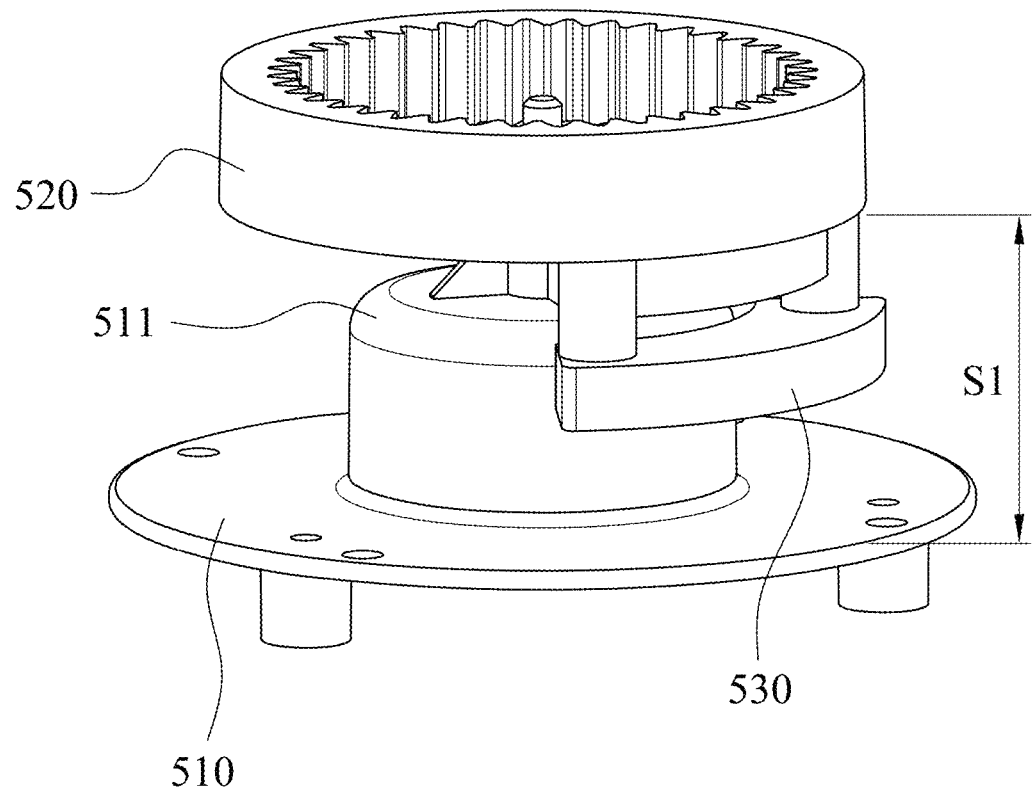
FIG. 5A is a three dimensional structure schematic view of a driving assembly of the cup structure according to 3rd example of one embodiment of the present disclosure.
Figure 5B:
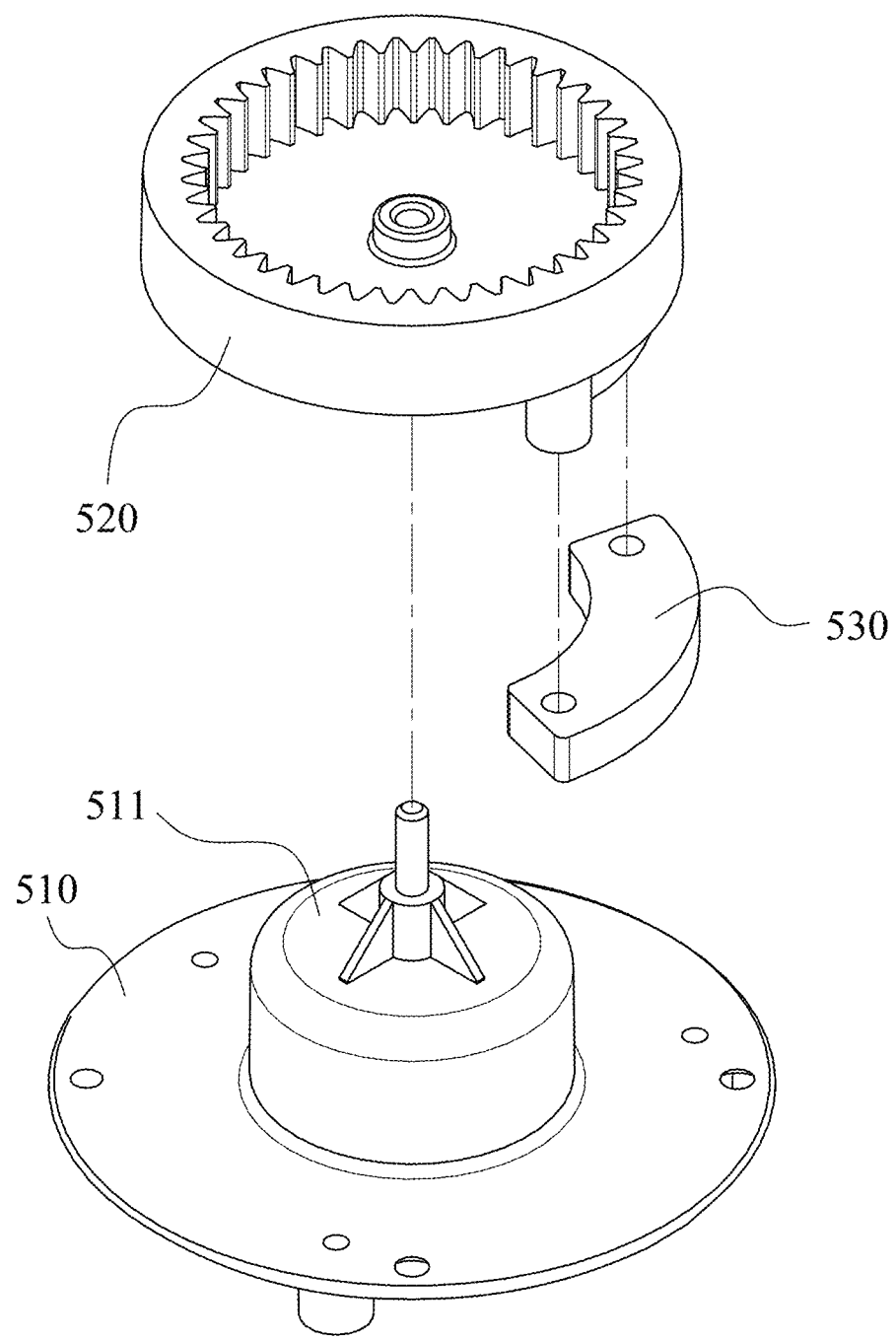
FIG. 5B is an explosive view of the driving assembly of FIG. 5A.

Please refer to FIG. 5A and FIG. 5B. FIG. 5A is a three dimensional structure schematic view of a driving assembly 500 of the cup structure according to 3rd example of one embodiment of the present disclosure. FIG. 5B is an explosive view of the driving assembly 500 of FIG. 5A. The driving assembly 500 can further include a second bottom plate 510 and a heavy block 530. The second bottom plate 510 is screwed on the top surface of the base (not shown), and the second bottom plate 510 includes a second axle 511 at a center of the second bottom plate 510, wherein the second axle 511 is connected to a center of the downside of the ring internal gear 520 of the transmitting assembly (not shown), and an annular rotating space S1 is formed by the second bottom plate 510, the second axle 511 and the ring internal gear 520. The heavy block 530 is screwed at the downside of the ring internal gear 520, wherein the heavy block 530 can be rotate around in the annular rotating space S1.

In this example, the heavy block 530 can be rotated around in the annular rotating space S1 by shaking the cup structure (not shown) horizontally so as to drive the ring internal gear 520 to rotate and further transmit the power to the transmitting assembly.

Figure 6A:
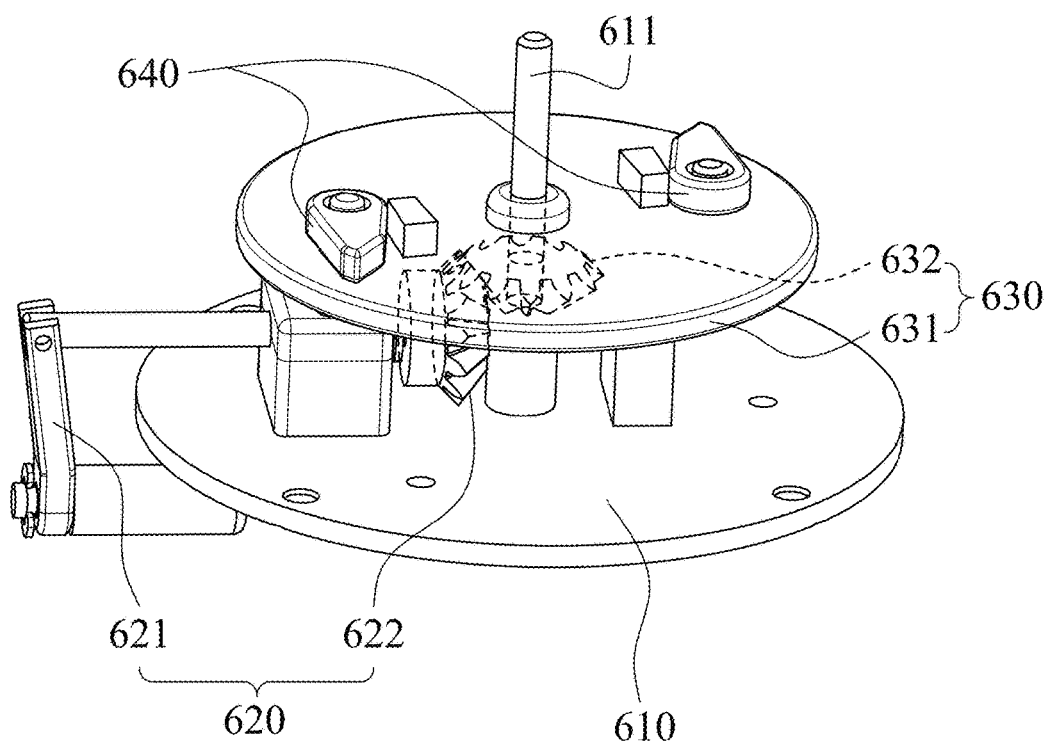
FIG. 6A is a three dimensional structure schematic view of a driving assembly of the cup structure according to 4th example of one embodiment of the present disclosure.
Figure 6B:
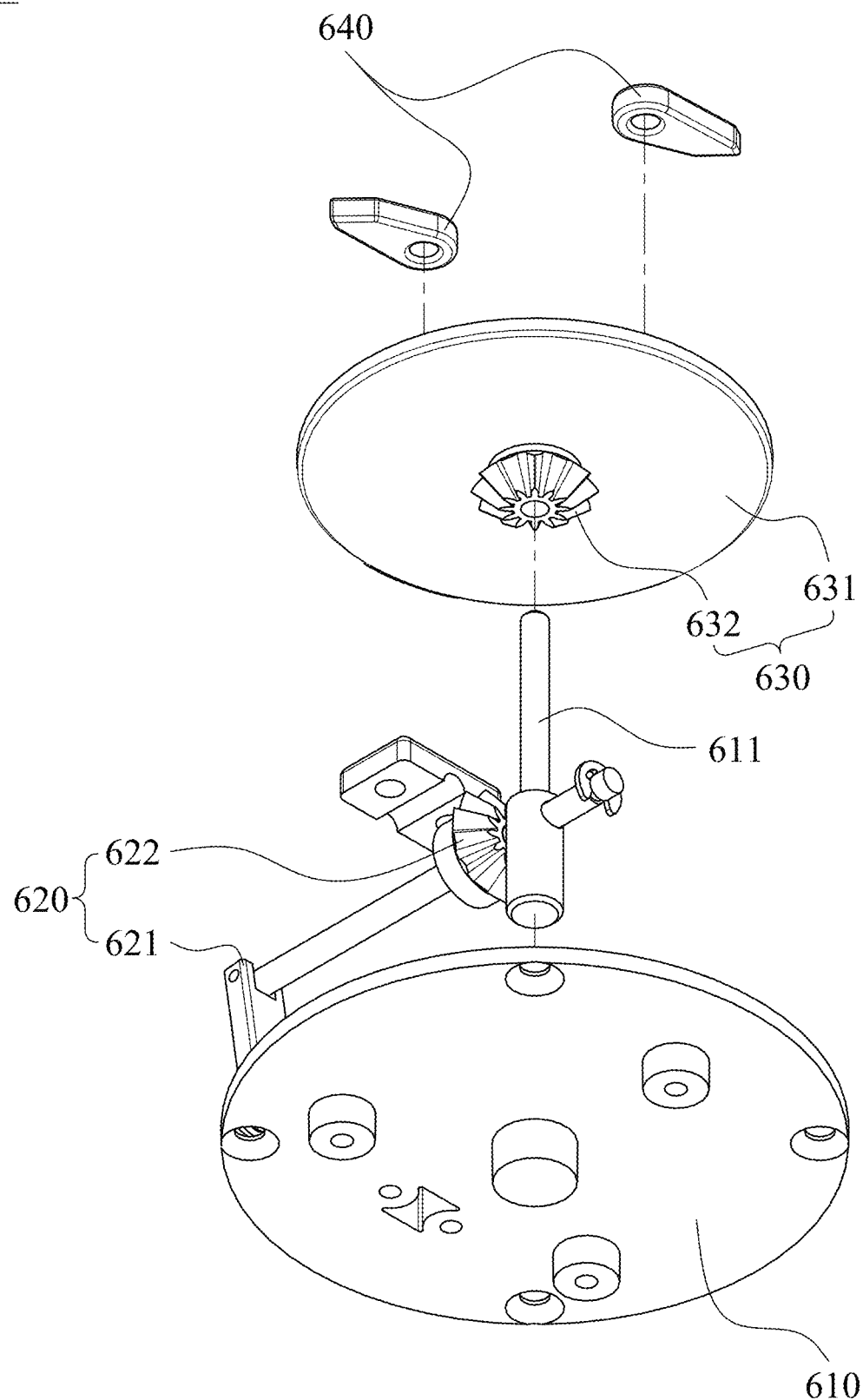
FIG. 6B is an explosive view of the driving assembly of FIG. 6A.

Please refer to FIG. 6A and FIG. 6B. FIG. 6A is a three dimensional structure schematic view of a driving assembly 600 of the cup structure according to 4th example of one embodiment of the present disclosure. FIG. 6B is an explosive view of the driving assembly 600 of FIG. 6A. The driving assembly 600 can further include a third bottom plate 610, an oscillating arm assembly 620, a second rotating assembly 630 and at least one third ratchet tooth 640. The third bottom plate 610 is screwed on the top surface of the base (not shown) and includes a third axle 611 at a center of a surface of the third bottom plate 610 facing the transmitting assembly (not shown), wherein one end of the third axle 611 is connected to a center of the downside of the ring internal gear (not shown). The oscillating arm assembly 620 includes an oscillating arm 621 and a side gear 622, wherein the oscillating arm 621 is disposed through the side gear 622, and one end of the oscillating arm 621 is disposed through a side surface of the third axle 611 and the other end of the oscillating arm 621 is disposed through and protruding from the base. The second rotating assembly 630 includes a second plate 631 and a second gear 632, wherein the second gear 632 is disposed protrudingly on a surface of the second plate 631 facing the base and is geared into the side gear 622, and the third axle 611 is disposed through a center of the second gear 632 and a center of the second plate 631. The at least one third ratchet tooth 640 is screwed on a surface of the second plate 631 facing the transmitting assembly, wherein the downside of the ring internal gear is internal geared into the at least one third ratchet tooth 640. In this example, the number of the third ratchet teeth 640 is two, but the present disclosure is not limited thereto.

In this example, the side gear 622 can be rotate and drive the second gear 632 by rotating a part of the oscillating arm 621 protruding from the base so as to make the second rotating assembly 630 rotate and further transmit the power to the transmitting assembly by the at least one third ratchet tooth 640.

Figure 7A:
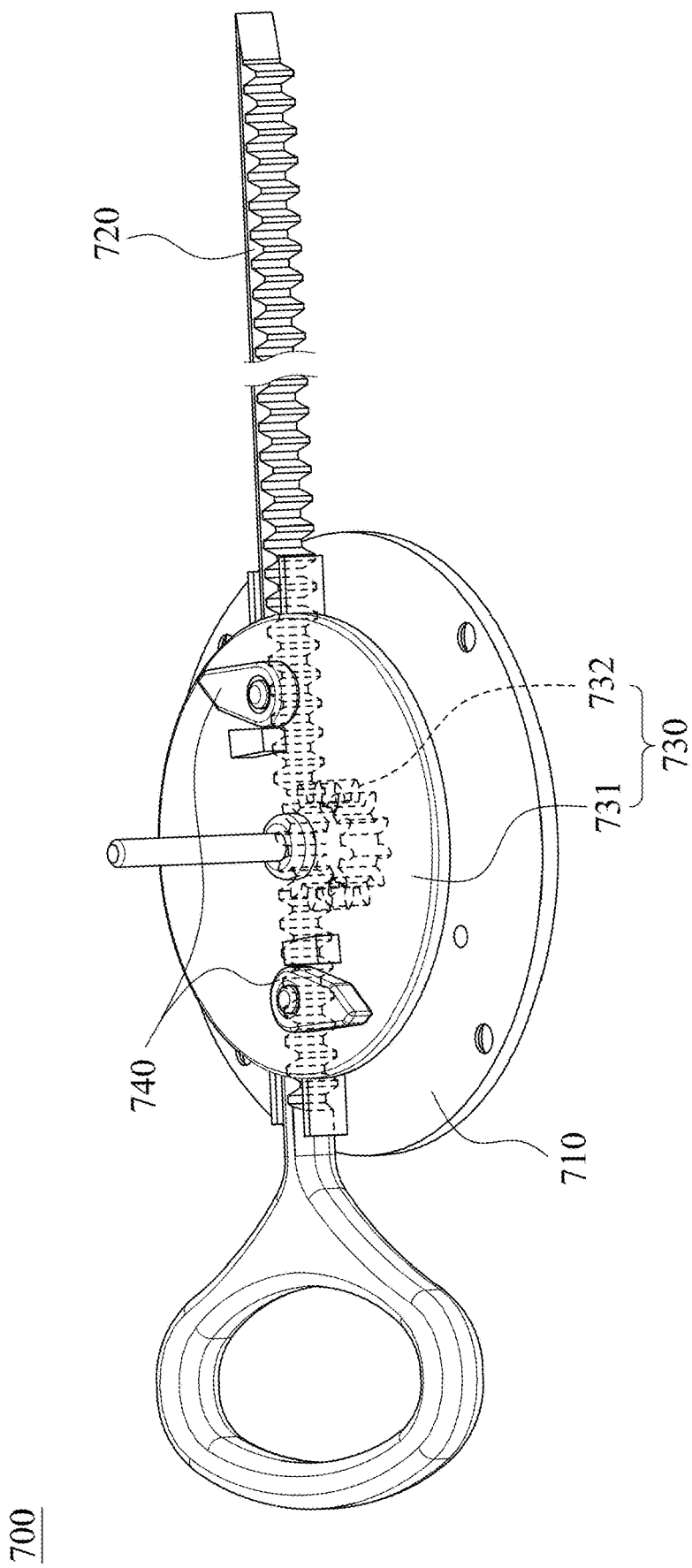
FIG. 7A is a three dimensional structure schematic view of a driving assembly of the cup structure according to 5th example of one embodiment of the present disclosure.
Figure 7B:
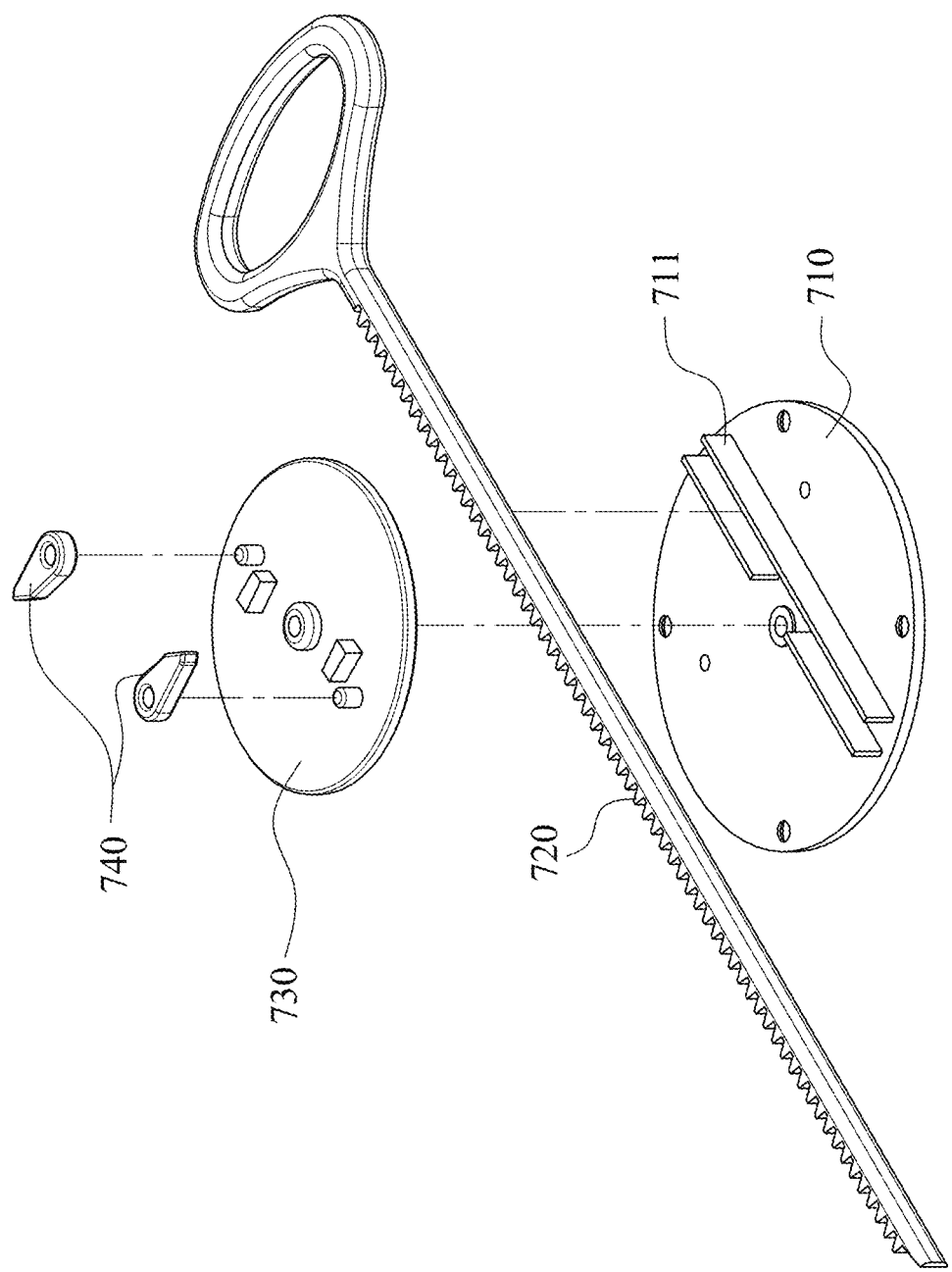
FIG. 7B is an explosive view of the driving assembly of FIG. 7A.

Please refer to FIG. 7A and FIG. 7B. FIG. 7A is a three dimensional structure schematic view of a driving assembly 700 of the cup structure according to 5th example of one embodiment of the present disclosure. FIG. 7B is an explosive view of the driving assembly 700 of FIG. 7A. The driving assembly 700 can further include a fourth bottom plate 710, a gear rack 720, a third rotating assembly 730 and at least one fourth ratchet tooth 740. The fourth bottom plate 710 is screwed on the top surface of the base (not shown) and includes a gear rack groove 711 on a surface of the fourth bottom plate 710 facing the transmitting assembly (not shown). The gear rack 720 is detachably disposed through and protruding from the base, wherein the gear rack 720 is disposed in the gear rack groove 711. The third rotating assembly 730 includes a third plate 731 and a third gear 732, wherein the third gear 732 is disposed protrudingly on a surface of the third plate 731 facing the base and is geared into the gear rack 720, and the third gear 732 is connected to the fourth bottom plate 710. The at least one fourth ratchet tooth 740 is screwed on a surface of the third plate 731 facing the transmitting assembly, wherein the downside of the ring internal gear (not shown) is internal geared into the at least one fourth ratchet tooth 740. In this example, the number of the fourth ratchet teeth 740 is two, but the present disclosure is not limited thereto.

In this example, a relative movement between the gear rack 720 and the third gear 732 can be performed by pulling out the gear rack 720 in a direction away from the cup structure (not shown) so as to rotate the third rotating assembly 730 and further transmit the power to the transmitting assembly by the at least one fourth ratchet tooth 740. Moreover, a relative movement in a reverse direction between the gear rack 720 and the third gear 732 can be performed by inserting the gear rack 720 to the cup structure so as to rotate the third rotating assembly 730 and further transmit the power to the transmitting assembly by the at least one fourth ratchet tooth 740.

In summary, the cup structure of the present disclosure through the combination of the base, the driving assembly, the transmitting assembly and the cover, and transmitting the power generated by the user operating the driving assembly to the mixer disposed on the cover by the transmitting assembly, the goal of stirring and mixing the fluid in the cup structure can be obtained.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A cup structure, comprising:
  a bottom comprising:
    a base, wherein a top surface of the base is sunk inward and forms an accommodating space;
    a driving assembly disposed in the accommodating space;
    a transmitting assembly disposed in the accommodating space and geared into the driving assembly; and
    a cover disposed and covered on the transmitting assembly and screwed on a top of the accommodating space, wherein the cover comprises:
      a protrusion;
      a water-blocking layer disposed around a side surface of the protrusion; and
      a mixer disposed on a top of the protrusion and having at least one mixing blade, wherein a length of a projection of the at least one mixing blade vertically projected on the protrusion is shorter than a radius of an inscribed circle of a top surface of the protrusion;
      a body, wherein a bottom edge of the body is detachably sleeved at an outer edge of the water-blocking layer; and
      a top cover covered on a top of the body;
    wherein the protrusion of the cover is protruded along a direction toward the top cover;
    wherein the transmitting assembly comprises a gear assembly and a transmitting axle, the transmitting assembly comprises an axial transmitting gear and at least one gear, the transmitting axle is disposed on a center of a top of the axial transmitting gear, and the transmitting axle is disposed through the cover and is connected to the mixer so as to transmit a power to the mixer.

2. The cup structure of claim 1, wherein the transmitting assembly further comprises:
  a ring internal gear comprising a plurality of teeth and a partition, wherein the partition separates the ring internal gear into an upper side and a in downside, the downside of the ring internal gear is internal geared into the driving assembly, and the upper side of the ring internal gear is internal geared into the at least one gear of the gear assembly.

3. The cup structure of claim 2, wherein a rotating laps output is enhanced by a gear ratio of the ring internal gear to the gear assembly.

4. The cup structure of claim 2, wherein the driving assembly further comprises:
  a volute spring disposed in the accommodating space;
  a reel, wherein a side surface of the reel is sunk inward to a center of the reel and forms a groove, and one end of the volute spring is connected to a bottom surface of the reel;
  a pulling cord, wherein one end of the pulling cord is connected to the groove, the other end of the pulling cord is disposed through the base and is connected to a pulling ring outer the base; and
  at least one first ratchet tooth screwed on a top of the reel, wherein the downside of the ring internal gear is internal geared into the at least one first ratchet tooth;
  wherein the reel is rotated and the volute spring is stretched by pulling the pulling cord away from the cup structure through the pulling ring, and the power is transmitted to the transmitting assembly by the at least one first ratchet tooth;
  wherein the volute spring rebounds in a reverse direction to make the reel rotate in a reverse direction after the pulling ring is loosened, so as to transmit the power to the transmitting assembly and make the pulling cord return to an original position.

5. The cup structure of claim 4, wherein the driving assembly further comprises:
  at least one brake screwed on the top of the reel and being adjacent to the at least one first ratchet tooth, wherein a number of the at least one brake is corresponding to a number of the at least one first ratchet tooth.

6. The cup structure of claim 2, wherein the driving assembly further comprises:
  a first bottom plate screwed on the top surface of the base and comprising a string-like through hole;
  a button disposed on a surface of the first bottom plate facing the transmitting assembly, wherein one end of the button is disposed through and protrudes from the base, a downside of the other end of the button extends toward the surface of the first bottom plate facing the base, and the downside of the other end of the button is disposed through the string-like through hole and forms a hook, wherein a center of a part of the button inside the base has a bar-like through hole at a direction vertical to the surface of the first bottom plate facing the transmitting assembly, and a side of the bar-like through hole has a plurality of ratchet teeth structures;
  an extension spring, wherein one end of the extension spring is disposed at the hook, and the other end of the extension spring is disposed on the surface of the first bottom plate facing the base and toward a direction in which the button protrudes from the base;
  a first rotating assembly comprising a first plate and a first gear, wherein the first gear is disposed protrudingly on a surface of the first plate facing the base and is disposed at a center of the surface of the first bottom plate facing the transmitting assembly through the bar-like through hole, and the ratchet teeth structures of the bar-like through hole are internal geared into the first gear; and
  at least one second ratchet tooth screwed on a surface of the first rotating assembly facing the transmitting assembly, wherein the downside of the ring internal gear is internal geared into the at least one second ratchet tooth;

wherein a relative movement between the ratchet teeth structures of the button and the first gear of the first rotating assembly is performed by pressing the button so as to rotate the first gear and drive the first rotating assembly to rotate and further transmit the power to the transmitting assembly through the at least one second ratchet tooth, and the button is released so as to rebound the extension spring and make the button return to an original position;

wherein a relative movement in a reverse direction between the ratchet teeth structures of the button and the first gear of the first rotating assembly is performed during a position returning process of the button so as to rotate the first gear and drive the first rotating assembly to rotate and further transmit the power to the transmitting assembly through the at least one second ratchet tooth.

7. The cup structure of claim 2, wherein the driving assembly further comprises:
 a second bottom plate screwed on the top surface of the base and comprising a second axle at a center of the second bottom plate, wherein the second axle is connected to a center of the downside of the ring internal gear, and an annular rotating space is formed by the second bottom plate, the second axle and the ring internal gear; and
 a heavy block screwed at the downside of the ring internal gear, wherein the heavy block is rotated around in the annular rotating space;
 wherein the heavy block is rotated around in the annular rotating space by shaking the cup structure horizontally so as to drive the ring internal gear to rotate and further transmit the power to the transmitting assembly.

8. The cup structure of claim 2, wherein the driving assembly further comprises:
 a third bottom plate screwed on the top surface of the base and comprising a third axle at a center of a surface of the third bottom plate facing the transmitting assembly, wherein one end of the third axle is connected to a center of the downside of the ring internal gear;
 an oscillating arm assembly comprising an oscillating arm and a side gear, wherein the oscillating arm is disposed through the side gear, and one end of the oscillating arm is disposed through a side surface of the third axle and the other end of the oscillating arm is disposed through and protrudes from the base;
 a second rotating assembly comprising a second plate and a second gear, wherein the second gear is disposed protrudingly on a surface of the second plate facing the base and is geared into the side gear, and the third axle is disposed through a center of the second gear and a center of the second plate; and
 at least one third ratchet tooth screwed on the a surface of the second plate facing the transmitting assembly, wherein the downside of the ring internal gear is internal geared into the at least one third ratchet tooth;
 wherein the side gear is rotated and drives the second gear by rotating a part of the oscillating arm protruding from the base so as to make the second rotating assembly rotate and further transmit the power to the transmitting assembly by the at least one third ratchet tooth.

9. The cup structure of claim 2, wherein the driving assembly further comprises:
 a fourth bottom plate screwed on the top surface of the base and comprising a gear rack groove on a surface of the fourth bottom plate facing the transmitting assembly;
 a gear rack detachably disposed through and protruding from the base, wherein the gear rack is disposed in the gear rack groove;
 a third rotating assembly comprising a third plate and a third gear, wherein the third gear is disposed protrudingly on a surface of the third plate facing the base and is geared into the gear rack, and the third gear is connected to the fourth bottom plate; and
 at least one fourth ratchet tooth screwed on the a surface of the third plate facing the transmitting assembly, wherein the downside of the ring internal gear is internal geared into the at least one fourth ratchet tooth;
 wherein a relative movement between the gear rack and the third gear is performed by pulling out the gear rack in a direction away from the cup structure so as to rotate the third rotating assembly and further transmit the power to the transmitting assembly by the at least one fourth ratchet tooth;
 wherein a relative movement in a reverse direction between the gear rack and the third gear is performed by inserting the gear rack to the cup structure so as to rotate the third rotating assembly and further transmit the power to the transmitting assembly by the at least one fourth ratchet tooth.

* * * * *